US012577351B2

(12) United States Patent
de Gans et al.

(10) Patent No.: US 12,577,351 B2
(45) Date of Patent: Mar. 17, 2026

(54) INCREASING THE MOLECULAR WEIGHT OF LOW MOLECULAR WEIGHT ALPHA,OMEGA-POLYSILOXANEDIOLS

(71) Applicant: Evonik Operations GmbH, Essen (DE)

(72) Inventors: Berend-Jan de Gans, Muelheim an der Ruhr (DE); Philippe Favresse, Ratingen (DE); Wilfried Knott, Essen (DE); Horst Dudzik, Essen (DE); Monika Johannes, Essen (DE)

(73) Assignee: Evonik Operations GmbH, Essen (DE)

(*) Notice: Subject to any disclaimer, the term of this patent is extended or adjusted under 35 U.S.C. 154(b) by 0 days.

(21) Appl. No.: 17/812,087

(22) Filed: Jul. 12, 2022

(65) Prior Publication Data

US 2023/0041322 A1 Feb. 9, 2023

(30) Foreign Application Priority Data

Jul. 14, 2021 (EP) .................................... 21185525

(51) Int. Cl.
*C08G 77/06* (2006.01)
*C08G 77/08* (2006.01)
*C08G 77/16* (2006.01)
*C09C 3/12* (2006.01)

(52) U.S. Cl.
CPC ............ *C08G 77/16* (2013.01); *C08G 77/06* (2013.01); *C09C 3/12* (2013.01)

(58) Field of Classification Search
CPC ................................ C08G 77/06; C08G 77/08
See application file for complete search history.

(56) References Cited

U.S. PATENT DOCUMENTS

| | | | | |
|---|---|---|---|---|
| 2,459,387 | A * | 1/1949 | McGregor ............ | C08G 77/06 528/21 |
| 4,066,680 | A | 1/1978 | Lewis et al. | |
| 5,371,161 | A | 12/1994 | Knott | |
| 6,291,622 | B1 | 9/2001 | Dröse et al. | |
| 6,307,082 | B1 | 10/2001 | Klein et al. | |
| 7,196,153 | B2 | 3/2007 | Burkhart et al. | |
| 7,598,334 | B2 | 10/2009 | Ferenz et al. | |
| 7,612,158 | B2 | 11/2009 | Burkhart et al. | |
| 7,612,159 | B2 | 11/2009 | Burkhart et al. | |
| 7,825,205 | B2 | 11/2010 | Knott et al. | |
| 7,825,206 | B2 | 11/2010 | Neumann et al. | |
| 7,825,209 | B2 | 11/2010 | Knott et al. | |
| 8,138,294 | B2 | 3/2012 | Henning et al. | |
| 8,283,422 | B2 | 10/2012 | Schubert et al. | |
| 8,309,664 | B2 | 11/2012 | Knott et al. | |
| 8,420,748 | B2 | 4/2013 | Henning et al. | |
| 8,598,295 | B2 | 12/2013 | Henning et al. | |
| 8,623,984 | B2 | 1/2014 | Henning et al. | |
| 8,729,207 | B2 | 5/2014 | Hartung et al. | |
| 8,779,079 | B2 | 7/2014 | Henning et al. | |
| 9,540,500 | B2 | 1/2017 | Ferenz et al. | |
| 10,399,998 | B2 | 9/2019 | Knott et al. | |
| 10,414,871 | B2 | 9/2019 | Knott et al. | |
| 10,544,267 | B2 | 1/2020 | Knott et al. | |
| 10,752,735 | B2 | 8/2020 | Knott et al. | |
| 10,752,801 | B2 | 8/2020 | Favresse et al. | |
| 10,766,913 | B2 | 9/2020 | Knott et al. | |
| 10,954,344 | B2 | 3/2021 | Knott et al. | |
| 11,021,575 | B2 | 6/2021 | Knott et al. | |
| 11,066,429 | B2 | 7/2021 | Knott et al. | |
| 11,220,578 | B2 | 1/2022 | Knott et al. | |
| 11,236,204 | B2 | 2/2022 | Favresse et al. | |
| 11,261,298 | B2 | 3/2022 | Favresse et al. | |
| 11,279,804 | B2 | 3/2022 | Knott et al. | |
| 11,286,351 | B2 | 3/2022 | Knott et al. | |
| 11,345,783 | B2 | 5/2022 | Knott et al. | |
| 11,359,056 | B2 | 6/2022 | Knott et al. | |
| 11,377,523 | B2 | 7/2022 | Favresse et al. | |
| 11,420,985 | B2 | 8/2022 | Knott et al. | |
| 11,472,822 | B2 | 10/2022 | Knott et al. | |
| 11,498,996 | B2 | 11/2022 | Knott et al. | |
| 2002/0161158 | A1 | 10/2002 | Burkhart et al. | |
| 2004/0132951 | A1 | 7/2004 | Burkhart et al. | |

(Continued)

FOREIGN PATENT DOCUMENTS

| | | |
|---|---|---|
| CN | 104109245 | 10/2014 |
| CN | 105885051 | 8/2016 |

(Continued)

OTHER PUBLICATIONS

Mojsiewicz-Pienkowska, Journal of Pharmaceutical and Biomedical Analysis 58 (2012). pp. 200-207. (Year: 2011).*
Viscosity Converting Chart, www.engineeringtoolbox.com/viscosity-converter-d (Year: 2009).*
U.S. Appl. No. 10/083,763, filed Feb. 25, 2002, 2002/0161158, Burkhart et al.
U.S. Appl. No. 13/650,221, filed Oct. 12, 2012, 2013/0041115, Knott et al.
U.S. Appl. No. 14/282,608, filed May 20, 2014, 2014/0256844, Henning et al.
U.S. Appl. No. 13/153,622, filed Jun. 6, 2011, 2011/0301254, Knott et al.
U.S. Appl. No. 16/759,413, filed Apr. 27, 2020, 2020/0339612, Knott et al.

(Continued)

*Primary Examiner* — Margaret G Moore
(74) *Attorney, Agent, or Firm* — Grüneberg Global IP, PLLC

(57) ABSTRACT

A process can be used for increasing the molecular weight of low molecular weight α,ω-polysiloxanediols. The process involves heating the low molecular weight α,ω-polysiloxanediols in the presence of acetic anhydride at temperatures of 80° C. to 220° C., preferably at temperatures of 100 to 200° C., and particularly preferably at temperatures of 120-180° C., for 1 h to 24 h, preferably for 2 h to 16 h, and particularly preferably for 3 h to 12 h. The molar amount of the silanol groups used is greater than that of the acetic anhydride used.

13 Claims, 1 Drawing Sheet

(56) References Cited

U.S. PATENT DOCUMENTS

| | | | |
|---|---|---|---|
| 2004/0147703 A1 | 7/2004 | Burkhart et al. |
| 2006/0155089 A1 | 7/2006 | Ferenz et al. |
| 2006/0241270 A1 | 10/2006 | Burkhart et al. |
| 2008/0153934 A1 | 6/2008 | Neumann et al. |
| 2008/0153992 A1 | 6/2008 | Knott et al. |
| 2008/0153995 A1 | 6/2008 | Knott et al. |
| 2010/0056649 A1 | 3/2010 | Henning et al. |
| 2010/0105843 A1 | 4/2010 | Knott et al. |
| 2010/0249339 A1 | 9/2010 | Henning et al. |
| 2010/0298455 A1 | 11/2010 | Henning et al. |
| 2011/0021693 A1 | 1/2011 | Henning et al. |
| 2011/0245412 A1 | 10/2011 | Schubert et al. |
| 2011/0301254 A1 | 12/2011 | Knott et al. |
| 2012/0010302 A1 | 1/2012 | Hartung et al. |
| 2012/0046486 A1 | 2/2012 | Henning et al. |
| 2013/0041115 A1 | 2/2013 | Knott et al. |
| 2014/0256844 A1 | 9/2014 | Henning et al. |
| 2016/0160009 A1 | 6/2016 | Ferenz et al. |
| 2018/0134850 A1 | 5/2018 | Knott et al. |
| 2018/0319823 A1 | 11/2018 | Knott et al. |
| 2019/0100625 A1 | 4/2019 | Knott et al. |
| 2019/0106441 A1 | 4/2019 | Knott et al. |
| 2019/0194488 A1 | 6/2019 | Favresse et al. |
| 2019/0248959 A1 | 8/2019 | Knott et al. |
| 2020/0055991 A1 | 2/2020 | Knott et al. |
| 2020/0055992 A1 | 2/2020 | Knott et al. |
| 2020/0308406 A1 | 10/2020 | Seyfried et al. |
| 2020/0339612 A1 | 10/2020 | Knott et al. |
| 2020/0377524 A1 | 12/2020 | Knott et al. |
| 2020/0377525 A1 | 12/2020 | Knott et al. |
| 2020/0377526 A1 | 12/2020 | Knott et al. |
| 2020/0377640 A1 | 12/2020 | Knott et al. |
| 2020/0377660 A1 | 12/2020 | Knott et al. |
| 2020/0377663 A1 | 12/2020 | Favresse et al. |
| 2020/0377665 A1 | 12/2020 | Knott et al. |
| 2020/0377666 A1 | 12/2020 | Knott et al. |
| 2020/0377667 A1 | 12/2020 | Favresse et al. |
| 2020/0377668 A1 | 12/2020 | Favresse et al. |
| 2020/0377669 A1 | 12/2020 | Knott et al. |
| 2021/0130551 A1 | 5/2021 | Knott et al. |
| 2021/0163687 A1 | 6/2021 | Knott et al. |
| 2021/0171719 A1 | 6/2021 | Knott et al. |
| 2021/0371598 A1 | 12/2021 | Knott et al. |
| 2022/0033587 A1 | 2/2022 | Knott et al. |

FOREIGN PATENT DOCUMENTS

| | | |
|---|---|---|
| DE | 20 2010 017 915 | 3/2013 |
| EP | 0 514 737 | 11/1992 |
| EP | 0 543 665 A1 | 5/1993 |
| GB | 899938 | 6/1962 |
| KR | 20170124997 | 11/2017 |

OTHER PUBLICATIONS

U.S. Appl. No. 17/147,592, filed Jan. 13, 2021, 2021/0130551, Knott et al.

U.S. Appl. No. 17/297,372, filed May 26, 2021, 2022/0033587, Knott et al.

U.S. Appl. No. 16/834,781, filed Mar. 30, 2020, 2020/0308406, Seyfried et al.

U.S. Appl. No. 16/851,385, filed Apr. 17, 2020, 2020/0377666, Knott et al.

U.S. Appl. No. 17/239,011, filed Apr. 23, 2021, 2021/0371598, Knott et al.

Extended European Search Report dated Dec. 21, 2021, in European Application No. 21185525.9, 6 pages.

Kalinina et al., "Polycondensation of Diethoxydimethylsilane in Active Medium", Silicon, vol. 7, 2015, pp. 95-106.

* cited by examiner

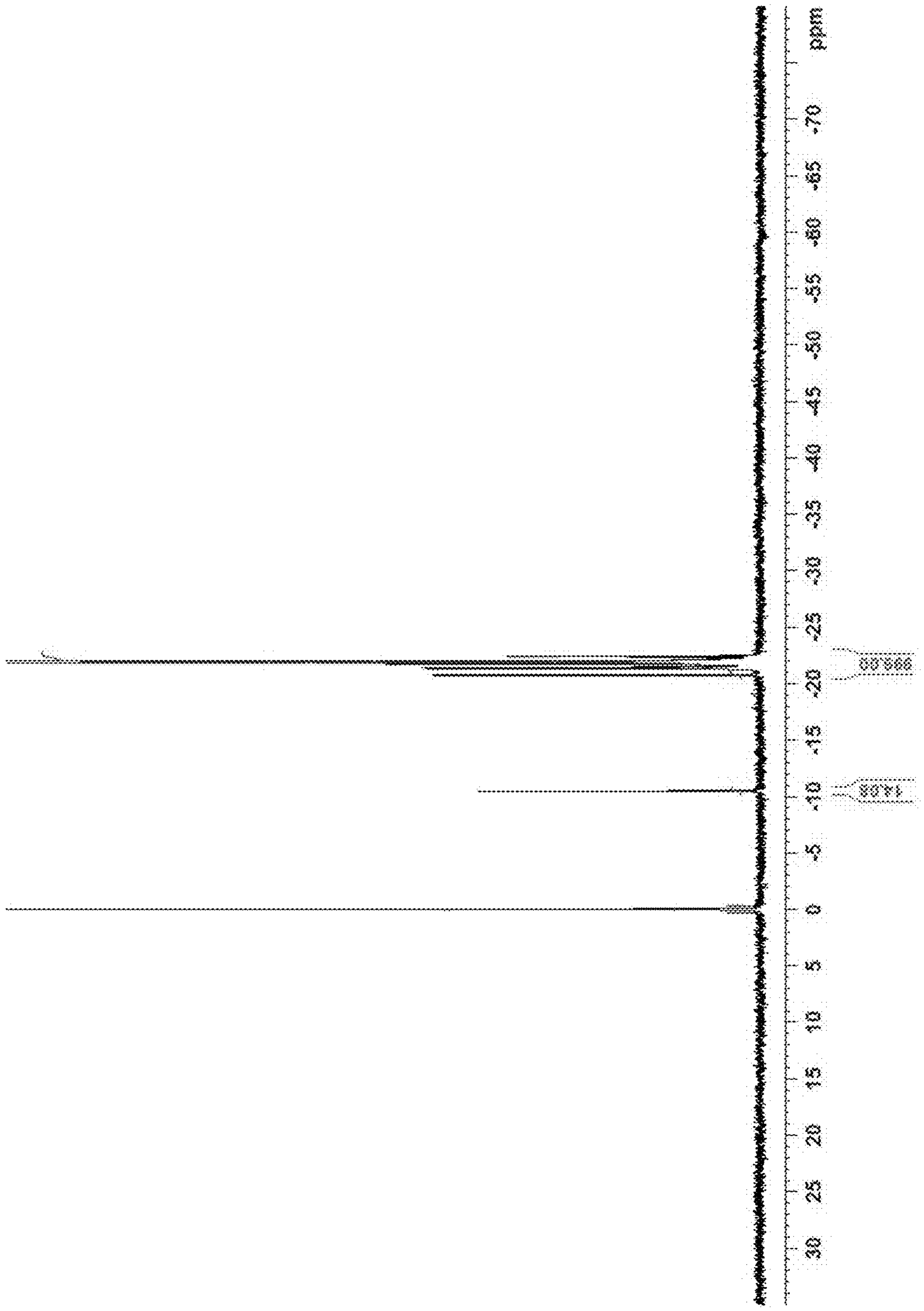
ppm
-70
-65
-60
-55
-50
-45
-40
-35
-30
-25
-20
-15
-10
-5
0
5
10
15
20
25
30

INCREASING THE MOLECULAR WEIGHT OF LOW MOLECULAR WEIGHT ALPHA,OMEGA-POLYSILOXANEDIOLS

CROSS-REFERENCE TO RELATED APPLICATIONS

This application claims priority to European Application No. 21185525.9, filed on Jul. 14, 2021, the content of which is hereby incorporated by reference in its entirety.

BACKGROUND OF THE INVENTION

Field of the Invention

The invention relates to a process for increasing the molecular weight of low molecular weight α,ω-polysiloxanediols.

Description of Related Art

Polysiloxanediols, particularly α,ω-polydimethylsiloxanediols, have been among the frequently used precursor materials and intermediates since the early days of the silicone industry. In particular, higher molecular weight representatives of this group of substances have found use in liquid silicone rubber (LSR).

Polysiloxanediols, α,ω-siloxanediols and α,ω-polysiloxanediols are used as synonyms herein.

Chlorosilanes obtained in the Müller-Rochow synthesis (direct synthesis), particularly dimethyldichlorosilane, are subjected to sophisticated hydrolysis and condensation processes and, after removal of byproducts, open up industrial access to polydimethylsiloxanediols. A major controlling influence is exerted here by the process temperature, the amount of water used, the type of solvent used, and the type and amount of catalysts used. Although it is possible to cover a wide range of chain lengths with the aid of optimized process parameters, both the controlled production of defined short α,ω-siloxanediol chains and the production of defined long α,ω-siloxanediol chains have remained a challenge. This problem already arises in chlorosilane hydrolysis, in which highly condensable ≡SiOH group-bearing species are depleted very readily by the hydrochloric acid formed as byproduct to give conversion condensates that are difficult to predict.

Focusing on the production of short-chain α,ω-siloxanediols, U.S. Pat. No. 4,066,680 teaches a two-stage process, the first step of which involves converting a siloxane with an acid anhydride and with a carboxylic acid in the presence of an acidic bleaching earth into a linear α,ω-diacyloxysiloxane, from which an α,ω-siloxanediol is then formed in a second step by heating with a weak aqueous base. Reactants used may be cyclic siloxanes, but also linear siloxanes arising from hydrolysis or co-hydrolyses (such as polydimethylsiloxanediols), and silanes bearing acetoxy groups or OH groups. A serious disadvantage of the teaching represented in U.S. Pat. No. 4,066,680 is that the process described yields significant amounts of cyclic siloxanes, as illustrated by Example 2 ibid. with the aid of a gas chromatography analysis of the acetoxysiloxane intermediate (=product after stage 1 prior to the alkaline hydrolysis). The sum total of the concentrations reported there of $D_4$ (octamethylcyclotetrasiloxane), $D_5$ (decamethylcyclopentasiloxane) and $D_6$ (dodecamethylcyclohexasiloxane) is 25.48% or else, if the proportion of acetic acid of 19.04% as non-siloxane component is subtracted from the gas chromatogram, even 31.47%.

With regard to the technical objective of producing α,ω-polysiloxanediols, the process is therefore completely unselective and, as a result of the need to remove the cyclic siloxanes, which are increasingly being outlawed, at no later than the polysiloxanediol stage, is complex and accordingly uneconomic.

Espousing the idea of an environmentally friendly technology that also dispenses with organochlorosilanes, A. Kalinia et al. in Silicon (2015) 7, 95-106 pursue a different strategy for producing α,ω-dihydroxy-functional polydimethylsiloxanes. The authors subject diethoxydimethylsilane to a polycondensation in acetic acid and obtain, in addition to cyclic siloxanes, yields of up to 75% of linear α,ω-dihydroxy-functional polydimethylsiloxanes. It becomes clear that this modem process is not productive either.

GB 899,938 describes a process for producing linear polysiloxanes that are allegedly free of cyclic siloxanes. This involves the production of acetoxysiloxanes in the first step by adding trimethylsilanols dropwise to a mixture consisting of methylacetoxysilanes, pyridine and toluene and then separating off the acetoxysilanes by means of vacuum distillation. In a second step, this is reacted with hydroxy-functional siloxanes in the presence of an amine or ammonium carboxylate.

The unpredictability of the linkage behaviour is detrimental to the use of amines or ammonium carboxylates. In addition, since these substances control the polymerization in an unpredictable manner when they remain in the copolymer, they may alter the properties of said copolymer during storage under varying temperature conditions in particular. An additional factor is that, in numerous fields of application, and not only in applications involving contact with food, the presence of amines or ammonium carboxylates is being viewed critically. When storing polysiloxanes produced in such a way, there may be yellowing or even formation of cyclic siloxanes.

The use of dihexylamines (Example 8 of GB 899,938 for example) also poses a threat to humans and the environment, since dihexylamine is known to belong to the category of acutely toxic substances. With regard to occupational safety and health protection of employees, measures and precautions have to be taken when handling dihexylamines due to odour nuisance and toxicity, which in turn causes complexity and costs.

SUMMARY OF THE INVENTION

Against this background, the technical object is defined as that of finding a selective process that reproducibly permits the production of higher molecular weight, essentially cycle-free α,ω-polysiloxanediols and overcomes at least one disadvantage of the prior art.

Surprisingly, it has now been found that essentially cycle-free α,ω-siloxanediols are obtained, overcoming the aforementioned difficulties, by heating low molecular weight α,ω-polysiloxanediols in the presence of acetic anhydride, wherein the molar amount of the silanol groups is greater than that of the acetic anhydride, at a temperature of 80° C. to 220° C., preferably 100 to 200° C. and particularly preferably 120-180° C. for 1 h to 24 h, preferably 2 h to 16 h and particularly preferably 3 h to 12 h.

The invention also includes the following embodiments:

1. Process for increasing the molecular weight of low molecular weight α,ω-polysiloxanediols, characterized in that the low molecular weight α,ω-polysiloxanediols are heated in the presence of acetic anhydride at temperatures of 80° C. to 220° C., preferably at temperatures of 100 to 200° C. and particularly preferably at temperatures of 120-180° C. for 1 h to 24 h, preferably for 2 h to 16 h and particularly preferably for 3 h to 12 h, wherein the molar amount of the silanol groups used is greater than that of the acetic anhydride used.

2. Process according to embodiment 1, characterized in that the molar ratio of silanol groups to acetic anhydride is 2.00 to 1.00 or preferably 2.00 to <1.00.
3. Process according to either of the preceding embodiments, characterized in that it is conducted under inert conditions, preferably anhydrous conditions and particularly preferably under a protective gas blanket.
4. Process according to any of the preceding embodiments, characterized in that the reaction mixture is neutralized after the reaction.
5. Process according to any of the preceding embodiments, characterized in that the linear α,ω-polysiloxanediols satisfy at least formula (I):

(I)

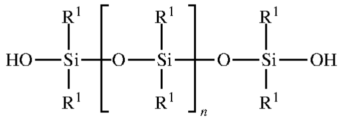

where $R^1$ is an alkyl radical and/or aromatic radical, comprising 1 to 10 carbon atoms, preferably a methyl radical, and where 10≤n≤10 000, preferably n is between 30 and 3000, particularly preferably n is between 100 and 1000.

6. Process according to any of the preceding embodiments, characterized in that the end product is cooled and filtered.
7. Process according to any of the preceding embodiments, characterized in that the increase in the number-average molecular weight of the end product is determined by means of $^{29}$Si-NMR spectroscopy.
8. Use of the end product produced according to any of embodiments 1-7 as raw material for the production of rubber, lubricating oil, defoamers, thermal oil, sealing compounds and adhesives, and for the functionalization of surfaces and particles.

BRIEF DESCRIPTION OF THE DRAWING

The FIGURE shows the $^{29}$Si-NMR spectrum according to Example 1.

DETAILED DESCRIPTION OF THE INVENTION

In the context of this invention, "essentially cycle-free" means that the cumulative proportion, determinable by gas chromatography, consisting of octamethylcyclotetrasiloxane ($D_4$), decamethylcyclopentasiloxane ($D_5$) and dodecamethylcyclohexasiloxane ($D_6$) amounts to ≤0.15% by weight, preferably ≤0.10% by weight, based on the content proportion of the α,ω-siloxanediol.

The process according to the invention surprisingly makes it possible to produce higher molecular weight, essentially cycle-free α,ω-polysiloxanediols, without adding amines or a catalyst. The simplified process regime, in the sense of a reduction in process steps, is also a further advantage according to the invention.

In the context of this invention, "higher molecular weight α,ω-polysiloxanediols" means that the end product has a higher number-average molecular weight than that of the reactant used.

The preferred acetic anhydride has a purity of greater than 99%, particularly preferably of greater than 99.5%. However, use may also be made of any acetic anhydride known to those skilled in the art.

It is preferable according to the invention that the molar ratio of silanol groups used to acetic anhydride is 2.00 to 1.00 or preferably 2.00 to <1.00.

To ensure the stoichiometric ratio which is the aim of the invention, use is made of $^{29}$Si-NMR spectroscopy, which allows the number-average molecular weight of the respective α,ω-polydimethylsiloxanediol to be determined. The characteristic signal for a silanol group (D-OH unit) is at a chemical shift of −10.7 ppm. The group of signals for the unmodified D units is in the shift region at −20 to −23 ppm. The number-average molecular weight Mn can be determined on the basis of the following formula:

$$M_n = 2M_{D\text{-}OH} + 2\frac{I_D}{I_{D\text{-}OH}}M_D$$

where I represents the integral value of the respective signal. The molecular weight of a D unit is $M_D$=74.1 g·mol$^{-1}$ and the molecular weight of a D-OH unit is $M_{D\text{-}OH}$=83.1 g·mol$^{-1}$, it being assumed in the latter case in purely mathematical terms that half the atomic mass of an oxygen atom should be counted towards the molecular weight of a D-OH unit.

Preferably, the process according to the invention is conducted under inert conditions, preferably anhydrous conditions and particularly preferably under a protective gas blanket. Suitable examples for this purpose are dry nitrogen or argon.

The reaction mixture is preferably neutralized after the reaction.

When the desired molecular weight has been reached, the end product can preferably be neutralized with a weak base to remove traces of acetic anhydride or convert any terminal acetoxy groups. Common bases are known to those skilled in the art. Examples here include the ammonium, sodium, potassium, calcium and magnesium salts of the hydrogencarbonate ion, of the carbonate ion, of the hydrogenphosphate ion and of the phosphate ion. Gaseous ammonia may also be used for neutralization.

The linear α,ω-polysiloxanediols preferably satisfy at least formula (I):

(I)

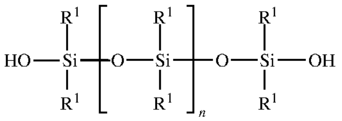

where $R^1$ is an alkyl radical and/or aromatic radical, comprising 1 to 10 carbon atoms, preferably a methyl radical, and where 10≤n≤10 000, preferably n is between 30 and 3000, particularly preferably n is between 100 and 1000.

Particularly preferably, the low molecular weight α,ω-polysiloxanediols are α,ω-polydimethylsiloxanediols.

The end product is preferably cooled and filtered.

The increase in the number-average molecular weight of the end product is preferably determined by means of $^{29}$Si-NMR spectroscopy.

The invention further provides the use of the end product obtainable by the process according to the invention as raw material for further chemical syntheses, such as for the production of rubber, lubricating oil, defoamers, thermal oil, sealing compounds and adhesives and for the functionalization of surfaces and particles.

The examples which follow are provided merely to elucidate this invention to those skilled in the art and do not constitute any limitation of the described subject matter or of the described process whatsoever.

Methods

Nuclear Magnetic Resonance (NMR)

NMR spectra were recorded on a Bruker Avance III 400 spectrometer. The $^{29}$Si-NMR spectra were measured at a frequency of 79.495 MHz on a Bruker PA BBO 400Si BB-H-D-10 z probe. The measurement time was 2.569 seconds per scan, with a total of 512 scans per spectrum. The $^{29}$Si-NMR spectrum was used to determine the number-average molecular weight of the respective α,ω-polydimethylsiloxanediol. The characteristic signal for a silanol group (D-OH unit) is at −10.7 ppm. The group of signals for the unmodified D units is in the shift region at −20 to −23 ppm. The number-average molecular weight $M_n$ can be determined on the basis of the following formula:

$$M_n = 2M_{D-OH} + 2\frac{I_D}{I_{D-OH}}M_D$$

where I represents the integral value of the respective signal. The molecular weight of a D unit is $M_D$=74.1 g·mol$^{-1}$ and the molecular weight of a D-OH unit is $M_{D-OH}$=83.1 g·mol$^{-1}$.

Gas Chromatography (GC)

The gas chromatograms are recorded on an Agilent Technologies GC 7890B GC instrument equipped with an HP-1 column; 30 m×0.32 mm ID×0.25 μm FT (Agilent Technologies No. 19091Z-413E) and hydrogen as carrier gas with the following parameters:

Detector: FID; 310° C.

Injector: split; 290° C.

Mode: constant flow, 2 ml/min

Temperature programme: 60° C. at 8° C./min-150° C. at 40° C./min-300° C. 10 min.

To ensure the molar ratio of the reactants which is the aim of the invention, use is made of $^{29}$Si-NMR spectroscopy, which allows the number-average molecular weight of the respective α,ω-polydimethylsiloxanediol to be reliably determined. The characteristic signal for a silanol group (D-OH unit) is at a chemical shift of −10.7 ppm. The group of signals for the unmodified D units is in the shift region at −20 to −23 ppm. The number-average molecular weight Mn can be determined on the basis of the following formula:

$$M_n = 2M_{D-OH} + 2\frac{I_D}{I_{D-OH}}M_D$$

where I represents the integral value of the respective signal. The molecular weight of a D unit is $M_D$=74.1 g·mol$^{-1}$ and the molecular weight of a D-OH unit is $M_{D-OH}$=83.1 g·mol$^{-1}$, it being assumed in the latter case in purely mathematical terms that half the atomic mass of an oxygen atom should be counted towards the molecular weight of a D-OH unit. The molecular weight thus ascertained represents the reference parameter according to the invention for the amount of acetic anhydride to be used.

Further Conditions

Where values are reported in % in the context of the present invention, these are % by weight values, unless stated otherwise. In the case of compositions, the values reported in % are based on the total composition, unless stated otherwise. Where averages are reported in the examples which follow, these are number averages, unless stated otherwise. Where measurement values are reported below, these measurement values, unless stated otherwise, were determined at a pressure of 101 325 Pa, a temperature of 23° C. and the ambient relative humidity of approximately 40%.

Materials and Equipment

α,ω-Polydimethylsiloxanediol (PDM siloxane), from Dow

Acetic anhydride, from Merck

Sodium hydrogencarbonate, from Sigma-Aldrich

Anhydrous sodium carbonate, from Sigma-Aldrich

Trifluoromethanesulfonic acid, from Sigma-Aldrich

Aluminium acetate, basic, from Sigma-Aldrich

EXAMPLES

Example 1 (Inventive)

200.00 g of α,ω-polydimethylsiloxanediol from Batch A (corresponding to 0.157 mol of silanol groups) and 8.03 g of acetic anhydride (0.079 mol) were mixed in a 500 ml four-necked flask with stirring, corresponding to a molar ratio of silanol to anhydride of 1.99 to 1.00. The reaction mixture was heated to 100° C. with further stirring under nitrogen inertization for a duration of 12 hours. The reaction mixture was subsequently cooled to 80° C. and neutralized with 4.16 g of sodium hydrogencarbonate. After stirring for a further 2 hours, the product was left to cool to room temperature and the solids were removed by filtration through a fluted filter. The isolated end product is clear and colourless. The number-average molecular weight was determined on the basis of the $^{29}$Si-NMR spectrum (see the FIGURE) and the content of $D_4$, $D_5$ and $D_6$ was determined by GC. The results are collated in Table 1. As apparent from the data in Table 1, the molecular weight of the original PDM siloxane was virtually quadrupled. The cumulative proportion of $D_4$, $D_5$ and $D_6$ was <0.15%.

Example 2 (Inventive)

300.00 g of α,ω-polydimethylsiloxanediol from Batch B (corresponding to 0.2007 mol of silanol groups) and 10.25 g of acetic anhydride (0.1004 mol) were mixed in a 500 ml four-necked flask with stirring, with the result that a molar ratio of silanol to anhydride of 2.00 to 1.00 was selected. The reaction mixture was heated to 150° C. under a nitrogen atmosphere and with further stirring for a total of 6 hours. Subsequently the temperature was lowered to 80° C. and neutralization was performed with 4.16 g of sodium hydrogencarbonate. After continuing to stir for a further 2 hours, the product was cooled to room temperature and filtered. The end product is clear and colourless. The number-average molecular weight was determined with the aid of $^{29}$Si-NMR spectroscopy and the content of $D_4$, $D_5$ and $D_6$ was determined by GC. The results are collated in Table 1. As apparent from the data in Table 1, the molecular weight of the original PDM siloxane was increased virtually six-fold. The cumulative proportion of $D_4$, $D_5$ and $D_6$ was <0.10%.

Example 3 (Non-Inventive)

300.00 g of α,ω-polydimethylsiloxanediol from Batch B and 0.36 g of trifluoromethanesulfonic acid as catalyst were mixed in a 500 ml four-necked flask with stirring and heated to 150° C. at a pressure of 50 mbar for a duration of 12 hours. The reaction mixture was subsequently cooled to 80° C. and neutralized with 8.8 g of anhydrous sodium carbonate. After continuing to stir for a further 2 hours, the reaction mixture was cooled to room temperature and filtered through a fluted filter. The filtrate obtained is clear and colourless. The number-average molecular weight thereof was determined with the aid of $^{29}$Si-NMR spectroscopy and the content of $D_4$, $D_5$ and $D_6$ was determined by GC. The results are collated in Table 1. It was found that substantial amounts of cyclic siloxanes were formed.

Example 4 (Non-Inventive)

300.00 g of α,ω-polydimethylsiloxanediol from Batch B and 0.020 g of basic aluminium acetate as catalyst were mixed in a 500 ml four-necked flask with stirring and heated to 150° C. at a reduced pressure of 60 mbar for a total of 15 hours. The reaction mixture was subsequently cooled and filtered. The filtrate obtained is clear and colourless. The number-average molecular weight of the end product was determined with the aid of $^{29}$Si-NMR spectroscopy and the content of $D_4$, $D_5$ and $D_6$ was determined by GC. The results are collated in Table 1. It was found that substantial amounts of cyclic siloxanes were formed.

TABLE 1

Molecular weights and cyclic siloxanes

| Sample | Mn/g · $mol^{-1}$ | D4 | D5 | D6 | Σ (D4 + D5 + D6) |
|---|---|---|---|---|---|
| PDM Batch A | 2543 | <0.02 | <0.02 | 0.02 | <0.06 |
| PDM Batch B | 2990 | <0.02 | <0.02 | 0.02 | <0.06 |
| Example 1 | 10 681 | 0.02 | 0.02 | 0.07 | 0.11 |
| Example 2 | 17 823 | 0.02 | 0.03 | 0.04 | 0.09 |
| Example 3 (non-inventive) | 12 483 | 0.27 | 0.06 | 0.05 | 0.38 |
| Example 4 (non-inventive) | 18 334 | 0.32 | 0.07 | 0.08 | 0.47 |

All FIGURES for the cyclic siloxanes D4, D5 and D6 are in % by weight.

The invention claimed is:

1. A process for increasing the molecular weight of at least one low molecular weight α,ω-polysiloxanediol, the process comprising:

heating the at least one low molecular weight α,ω-polysiloxanediol in the presence of acetic anhydride in a reaction mixture, at a temperature of 80° C. to 220° C. for 1 h to 24 h, to obtain an end product comprising at least one linear α,ω-polysiloxanediol, and neutralizing the reaction mixture after the heating with a weak base, wherein a molar amount of silanol groups used is greater than that of the acetic anhydride used, the at least one linear α,ω-polysiloxanediol satisfies at least formula (I):

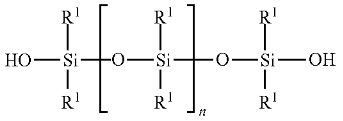

(I)

wherein $R^1$ is an alkyl radical, comprising 1 to 2 carbon atoms, and wherein $10 \leq n \leq 10,000$, and the end product contains ≤0.15% by weight of a combined amount of octamethylcyclotetrasiloxane, decamethylcyclopentasiloxane, and dodecamethylcyclohexasiloxane.

2. The process according to claim 1, wherein a molar ratio excess of the silanol groups to the acetic anhydride does not exceed 2.00 to 1.00.

3. The process according to claim 1, wherein the process is conducted under inert conditions.

4. The process according to claim 1, wherein the end product is cooled and filtered.

5. The process according to claim 1, wherein an increase in the number-average molecular weight of the end product is determined by $^{29}$Si-NMR spectroscopy.

6. The process according to claim 1, wherein the heating is at a temperature of 120° C. to 180° C.

7. The process according to claim 1, wherein the heating is for 3 h to 12 h.

8. The process according to claim 2, wherein the molar ratio excess of the silanol groups to the acetic anhydride is 2.00 to <1.00.

9. The process according to claim 3, wherein the process is conducted under anhydrous conditions.

10. The process according to claim 3, wherein the process is conducted under a gas blanket.

11. The process according to claim 1, wherein $R^1$ is a methyl radical.

12. The process according to claim 1, wherein n is between 100 and 1,000.

13. The process according to claim 1, wherein the reaction mixture does not include an amine or ammonium carboxylate.

* * * * *